(12) United States Patent
Brinker et al.

(10) Patent No.: US 11,849,660 B2
(45) Date of Patent: Dec. 26, 2023

(54) TILLAGE IMPLEMENT HAVING HYDRAULIC DOWN-PRESSURE

(71) Applicant: AGCO Corporation, Duluth, GA (US)

(72) Inventors: Jarret Lee Brinker, Beloit, KS (US); Jeffrey Scott Hughes, Beloit, KS (US); Joseph Shawn Meier, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 636 days.

(21) Appl. No.: 16/762,460

(22) PCT Filed: Nov. 5, 2018

(86) PCT No.: PCT/IB2018/058659
§ 371 (c)(1),
(2) Date: May 7, 2020

(87) PCT Pub. No.: WO2019/123042
PCT Pub. Date: Jun. 27, 2019

(65) Prior Publication Data
US 2021/0368669 A1    Dec. 2, 2021

Related U.S. Application Data

(60) Provisional application No. 62/608,742, filed on Dec. 21, 2017.

(51) Int. Cl.
*A01B 63/32* (2006.01)
*A01B 63/00* (2006.01)
(Continued)

(52) U.S. Cl.
CPC ............ *A01B 63/32* (2013.01); *A01B 63/008* (2013.01); *A01B 63/22* (2013.01); *A01B 49/027* (2013.01); *A01B 73/02* (2013.01)

(58) Field of Classification Search
CPC ......... A01C 63/22; A01C 63/32; A01B 63/16; A01B 63/22; A01B 63/32; A01B 21/08; A01B 73/04; A01B 49/02
See application file for complete search history.

(56) References Cited

U.S. PATENT DOCUMENTS 2,638,045 A * 5/1953 Heitshu .................. B62D 49/02
172/321
4,622,884 A * 11/1986 Buchl ..................... F15B 15/24
91/445
(Continued)

FOREIGN PATENT DOCUMENTS

EP    2717 667 B1    8/2017

OTHER PUBLICATIONS

UK Intellectual Property Office, Search Report for related UK Application No. GB1800457.2, dated Jul. 10, 2018.
(Continued)

*Primary Examiner* — Jessica H Lutz

(57) ABSTRACT

A tillage implement has a frame with a center section and first and second outer wing sections hingedly attached the center section such that the wing sections can be operably raised and lowered between a field-working position and a transport position. The sections each carry tillage tools for working the soil. Controlling a precharge in a secondary side of a hydraulic circuit enables the operator of the implement to adjust the downward pressure precharge provided by a plurality of hydraulic cylinders based on a desired stiffness of the implement. A pressure-reducing valve is configured such that flow from the hydraulic supply applies downward pressure precharge on the plurality of tillage tools. Once this desired precharge has been achieved, flow from the hydraulic supply is shut off and a check valve holds the pressure such that the plurality of hydraulic cylinders holds the tillage tools in position.

15 Claims, 3 Drawing Sheets

(51) Int. Cl.
  *A01B 63/22* (2006.01)
  *A01B 49/02* (2006.01)
  *A01B 73/02* (2006.01)

(56) References Cited

U.S. PATENT DOCUMENTS

| | | | | |
|---|---|---|---|---|
| 6,044,916 | A * | 4/2000 | Hundeby | A01C 5/062 |
| | | | | 172/637 |
| 6,631,916 | B1 * | 10/2003 | Miller | A01B 69/004 |
| | | | | 280/468 |
| 6,810,968 | B2 * | 11/2004 | Myers | A01B 63/22 |
| | | | | 172/452 |
| 7,063,167 | B1 * | 6/2006 | Staszak | A01B 63/22 |
| | | | | 172/322 |
| 8,550,020 | B2 * | 10/2013 | Sauder | F15B 11/042 |
| | | | | 701/50 |
| 9,055,712 | B2 * | 6/2015 | Bassett | A01B 63/111 |
| 9,232,687 | B2 * | 1/2016 | Bassett | A01C 7/203 |
| 9,247,687 | B2 * | 2/2016 | Gray | A01B 29/048 |
| 9,723,776 | B2 | 8/2017 | Sporrer et al. | |
| 9,723,778 | B2 * | 8/2017 | Bassett | A01C 5/06 |
| 10,444,774 | B2 * | 10/2019 | Bassett | G01L 5/0061 |
| 2008/0093093 | A1 * | 4/2008 | Sheppard | A01B 61/046 |
| | | | | 172/2 |
| 2012/0048160 | A1 | 3/2012 | Adams et al. | |
| 2016/0044857 | A1 | 2/2016 | Sporrer et al. | |
| 2016/0316611 | A1 * | 11/2016 | Fink | F15B 11/028 |
| 2017/0251588 | A1 * | 9/2017 | Sporrer | A01B 79/00 |
| 2017/0261009 | A1 * | 9/2017 | Paulessen | F15B 11/003 |

OTHER PUBLICATIONS

European Patent Office, International Search Report for related International Application No. PCT/IB2018/058659, dated Mar. 19, 2019.

* cited by examiner

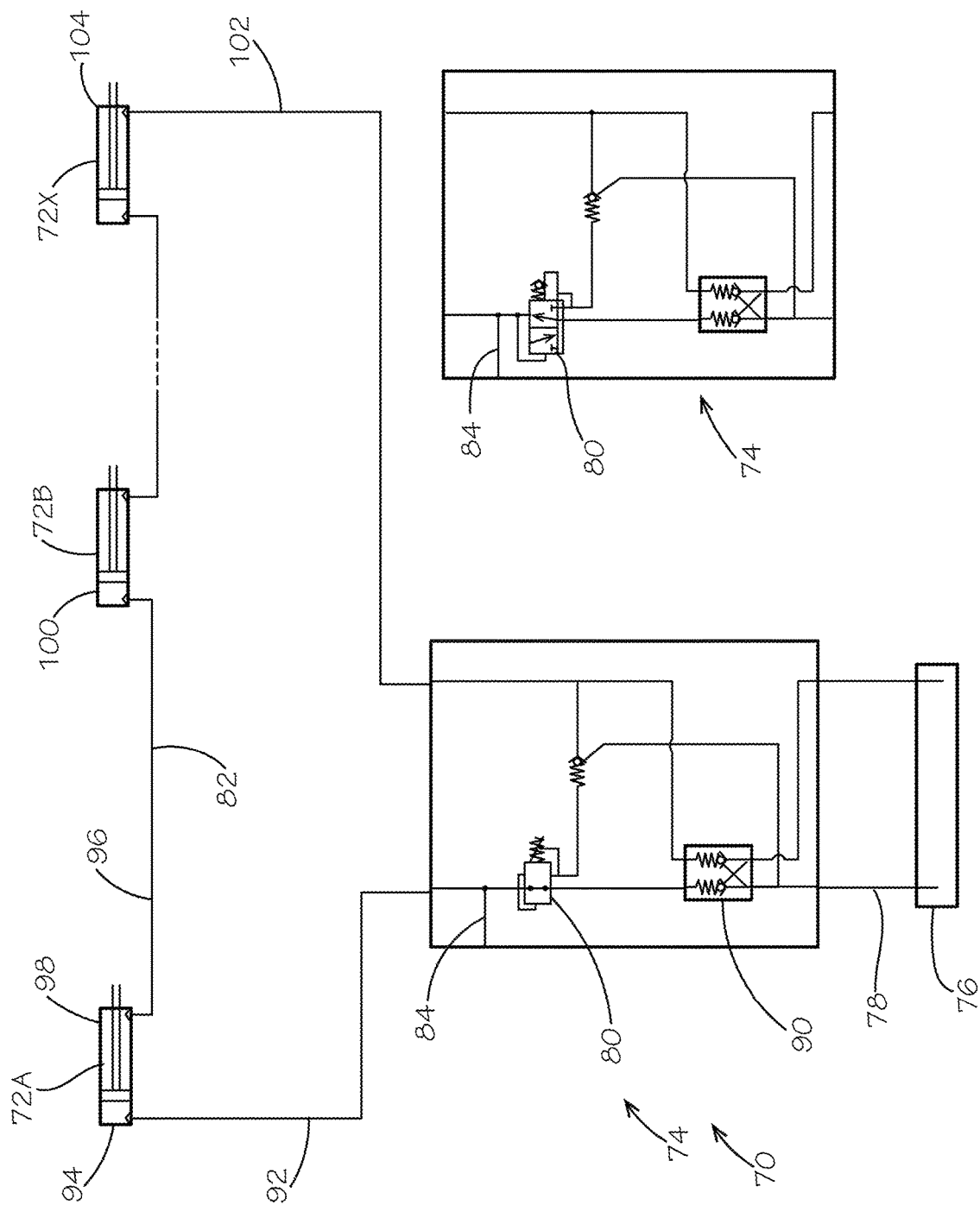

TILLAGE IMPLEMENT HAVING HYDRAULIC DOWN-PRESSURE

CROSS-REFERENCE TO RELATED APPLICATIONS

This application is a national phase entry under 35 U.S.C. § 371 of International Patent Application PCT/IB2018/058659, filed Nov. 5, 2018, designating the United States of America and published in English as International Patent Publication WO 2019/123042 A1 on Jun. 27, 2019, which claimed the benefit of the filing date of U.S. Provisional Patent Application 62/608,742, "Tillage Implement Having Hydraulic Down-Pressure," filed Dec. 21, 2017, the entire disclosure of each of which is incorporated herein by reference.

FIELD

This disclosure relates generally to agricultural implements and, more particularly to multi-section tillage implements having ground-engaging tillage tools.

BACKGROUND

Many agricultural tillage implements utilize a depth-control system for positioning the height of the implement relative to the soil. The depth-control system typically uses the main lift wheels to set the depth of the ground-engaging tools. Depending on the soil conditions expected to be encountered by the implement, the depth-control system is adjusted to preselect a desired tillage depth. Hydraulic cylinders mounted to the implement are typically used to adjust the depth.

When a tillage implement has multiple ground-engaging tools that can be set independently to different depths, the depth setting of each individual ground-engaging tool can be hard to set and can affect the performance of the other ground-engaging tools. For example, the depth setting of a first ground-engaging tool may be different enough from a desired depth of a second ground-engaging tool that setting the ground-engaging tool may cause the second tool to be raised out of the ground, hindering performance and affecting field finish. Depth-setting changes are also time consuming and not very convenient. Automation of the depth-setting process would help farmers quickly make the adjustments they should be making as well as make the depth settings more consistent.

BRIEF SUMMARY

In one embodiment, a tillage implement has a frame with a center section and first and second outer wing sections hingedly attached to respective outer ends of the center section such that the first and second wing sections can be operably raised and lowered between a field-working position and a transport position. The center section and the first and second outer wing sections each carry tillage tools for working the soil as the tillage implement is advanced across a field. The tillage implement includes a gang assembly on which a plurality of tillage tools are mounted, the gang assembly including a left arm, a center arm, and a right arm, each of the left, center and right arms having a rotating shaft that is supported on a support bar. The support bar of each arm is mounted to a respective left, center and right rock shaft, each of the left, center and right rock shaft supported for rotational movement relative to the frame. The tillage implement has a hydraulic down-pressure system configured to act upon the gang assembly. The hydraulic down-pressure system includes a plurality of hydraulic cylinders, the hydraulic cylinders extend between the frame and the left, center and right rock shafts and are configured to rotate the rock shafts. The plurality of hydraulic cylinders connect to the plurality of tillage tools through the rock shafts such that the plurality of hydraulic cylinders provide a downward pressure precharge on the tillage tools. The hydraulic down-pressure system includes a hydraulic circuit associated with the hydraulic down-pressure system. The hydraulic circuit includes a hydraulic supply in a primary side of the hydraulic circuit, wherein the hydraulic down-pressure system includes a pressure-reducing valve configured to regulate a pressure in a secondary side of the hydraulic circuit. The hydraulic circuit includes a blocking valve configured to isolate the pressure-reducing valve and hydraulic circuit from the hydraulic supply and a pressure gauge configured to read the pressure in the secondary side of the circuit and is used so that an operator may use the pressure-reducing valve to manually set the pressure in the secondary side.

Controlling the precharge in the secondary side of the hydraulic circuit enables the operator of the implement to adjust the downward pressure precharge provided by the plurality of hydraulic cylinders based on a desired stiffness of the implement. The pressure-reducing valve is used to command flow from the hydraulic supply through the pressure-reducing valve and put downward pressure precharge on the plurality of tillage tools. Once this desired downward pressure precharge has been achieved, flow from the hydraulic supply is shut off and the blocking valve holds the pressure such that the plurality of hydraulic cylinders hold their respective tillage tools in the desired position.

In one aspect, the tillage implement includes frame-supporting wheels, the frame-supporting wheels being mounted to wheel-mounting spars which are rigidly attached to a rock shaft with the rock shaft mounted to the frame for rotational movement relative to the frame controlled by a depth-control system. The depth-control system includes an actuation mechanism used to rotate the rock shaft and move the frame relative the frame-supporting wheels upwardly or downwardly to raise or lower the working depth of the tools.

These and other features and advantages of this disclosure are described in, or are apparent from, the following detailed description of various exemplary embodiments.

BRIEF DESCRIPTION OF THE DRAWINGS

The above mentioned and other features will become more apparent and will be better understood by reference to the following description of embodiments in conjunction with the accompanying drawings, wherein:

FIG. 3 is a schematic view of a hydraulic circuit of the tillage implement with a pressure-reducing valve; and FIG. 4 is a schematic view of the hydraulic circuit of the tillage implement having an alternate pressure-reducing valve.

Corresponding reference characters indicate corresponding parts throughout the views of the drawings.

DETAILED DESCRIPTION

Embodiments will now be described in the following detailed description with reference to the drawings, wherein certain embodiments are described in detail to enable practice thereof. Although described with reference to these specific preferred embodiments, it will be understood that the disclosure is not limited to these preferred embodiments. But to the contrary, numerous alternatives, modifications, and equivalents will become apparent from consideration of the following detailed description.

Figure 1:
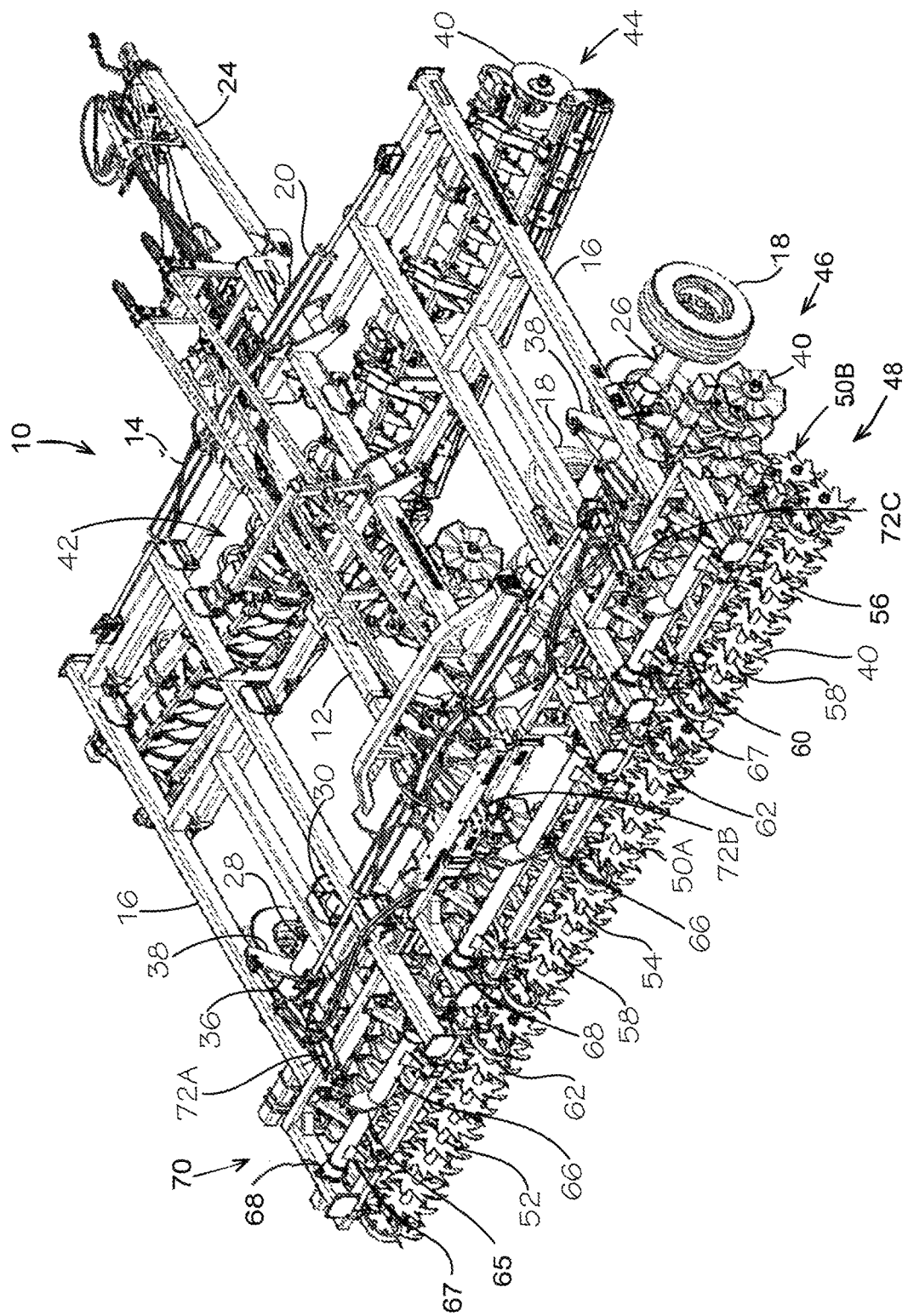
FIG. 1 is a perspective view of a tillage implement.

The tillage implement 10 illustrated in FIG. 1 has been selected as but one of many different possible examples of machines with which the present disclosure may be utilized. In the illustrated embodiment, implement 10 is a three-section folding machine having a frame 12 with a center section 14 and two outer wing sections 16 hingedly attached to respective outer ends of the center section 14. The frame 12 is supported above the ground by frame-supporting wheels 18. As well known in the art, the wing sections 16 can "flex" about respective fore-and-aft axes at hinge points so as to accommodate changes in ground contour experienced locally by the sections 14, 16 of the implement 10. In addition, hydraulic wing lift cylinders 20 are used for raising and lowering the wing sections 16 between a field-working position (shown) and a field transport position. A tongue 24 projects forwardly from the center section 14 for hitching the machine to a towing vehicle (not shown).

The frame-supporting wheels 18 are mounted to wheel-mounting spars 26, which are rigidly attached to a rock shaft 28. The rock shaft 28 is mounted to the frame 12 by suitable bearings 30, which support the rock shaft 28 for rotational movement relative to the frame 12, controlled by a depth-control system 32. The depth-control system 32 includes an actuation mechanism 36 used to rotate the rock shaft 28. In the illustrated embodiment, the actuation mechanism 36 includes a hydraulic cylinder extending between the frame 12 and an upwardly extending weldment 38. Thus, actuation of the cylinder 36 actuates the rock shaft 28 to pivot within the bearings 30 to move the frame 12 relative the frame-supporting wheels 18 upwardly or downwardly to raise or lower the working depth of tillage tools 40. The depth-control system 32 uses suitable hydraulic valves for controlling fluid flow to the cylinder 36 as would be known in the art.

Each of the sections 14, 16 carries a plurality of tillage tools 40 such as gangs of discs, coulter blades and/or rolling tines for working the soil as the tillage implement 10 is advanced across a field. The tools 40 are mounted on a plurality of gang assemblies 42 attached to the main frame 12. In accordance with one example configuration illustrated in FIG. 1, the plurality of gang assemblies 42 includes a first stage 44 of angled disc blades followed by disc gang reels intercepting the soil from the disc blades. Behind the first stage 44, the plurality of gang assemblies 42 includes a second stage 46 of wavy coulter blades. Behind the second stage 46, the plurality of gang assemblies 42 includes a third stage 48 with two rows of finishing rolling tines. However, as one skilled in the art will appreciate, different tillage tools 40 arranged on the gang assemblies 42 configured in more or fewer stages may be used.

Figure 2:
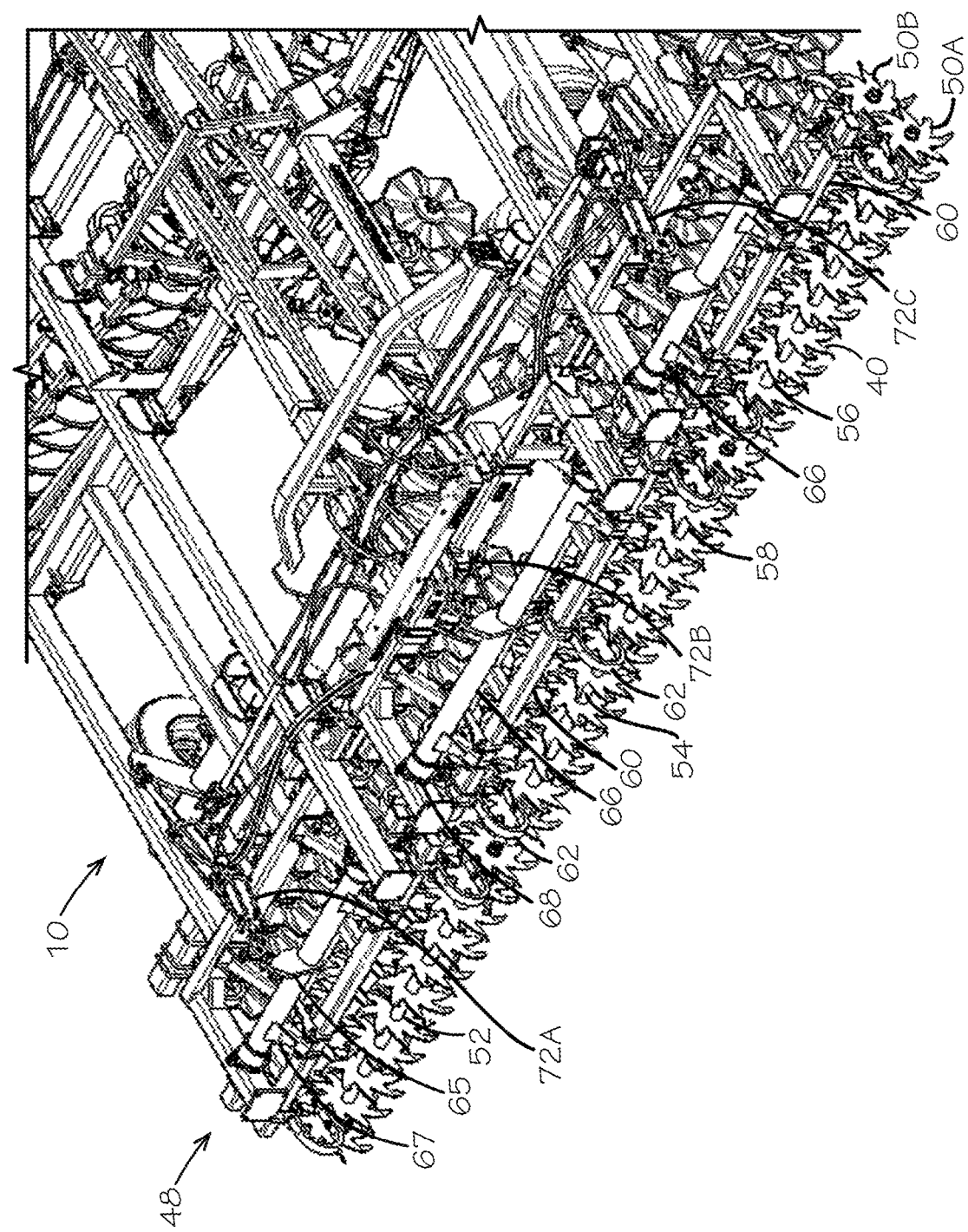
FIG. 2 is an enlarged perspective view of a portion of the tillage implement of FIG. 1.

Turning also now to FIG. 2, the gang assemblies 42 of tillage tools 40 in the third stage 48 include a rear gang 50A including a left arm 52, a center arm 54, and a right arm 56. Each arm 52, 54, 56 includes a rotating shaft 58 which is supported on a support bar 60 using a shaft mounting mechanism 62. In the illustrated embodiment, the third stage 48 also includes a second gang 50B positioned forward of the rear gang 50A that is substantiality a mirror image of the rear gang 50A. It is desirable that the shafts 58 be resiliently mounted to their respective support bars 60 with a tool-mounting mechanism 62 to prevent the tillage tools 40 from being damaged or broken when striking an obstacle, such as a large rock in the field. Desirably, the tool-mounting mechanism 62 for the ganged tillage tools 40 are C-shaped springs that allow the shafts 58 freedom to move vertically, laterally, and/or torsionally away from obstacles and hard spots to avoid damage to the tillage tools 40. The support bar 58 of each arm 52, 54, 56 of the rear gang 50A is mounted to a rock shaft 66 with suitable brackets 67 and bearings 68, which support the rock shaft 66 for rotational movement relative to the frame 12. While FIG. 2 and the description thereto focus on the third stage 48 of gang assemblies 42, one skilled in the art will understand that any of the stages of the plurality of gang assemblies 42 may be similarly mounted to the frame 12 using sound engineering judgment.

Turning also now to FIG. 3, the implement 10 has a hydraulic down-pressure system 70 configured to act upon at least some of the gang assemblies 42 of tillage tools 40. The hydraulic down-pressure system 70 includes plurality of hydraulic cylinders 72A, 72B, 72X used to rotate the rock shaft 66. The hydraulic cylinders 72A, 72B, 72C extend between the frame 12 and an upwardly extending weldment 65 on the rock shafts 66. While the illustrated embodiment in FIG. 2 shows three hydraulic cylinders 72A, 72B, 72C, one skilled in the art will understand that the hydraulic down-pressure system 70 may utilize additional hydraulic cylinders 72A-72X as shown in FIG. 3. As perhaps best seen in FIG. 2, the hydraulic cylinders 72A, 72B, 72C connect with tillage tools 40 through the rock shafts 66 such that cylinders 72A, 72B, 72C provide a downward pressure or precharge on the tillage tools 40. The hydraulic cylinders 72A-72X may be of conventional design well understood by those skilled in the art and need not be described in greater detail herein.

FIG. 3 illustrates a hydraulic circuit 74 associated with the hydraulic down-pressure system 70. The hydraulic circuit 74 includes a hydraulic supply 76 in a primary side 78 of the hydraulic circuit 74. The hydraulic supply 76 is provided by the towing vehicle (not shown). The hydraulic down-pressure system 44 includes a pressure-reducing valve 80 designated to act as a pressure-regulating device for a secondary side 82 of the hydraulic circuit 74. In one embodiment, the pressure-reducing valve 80 is a pilot-operated, sliding spool, screw-in cartridge style, hydraulic pressure-reducing valve. In the illustrated embodiment, a pressure gauge 84 reads the pressure in the secondary side 82 of the circuit 74 and is used so that an operator may use the pressure-reducing valve 80 to manually set the pressure in the secondary side 82. FIG. 4 illustrates an alternate embodiment of the hydraulic circuit 74 in which the pressure gauge 84 includes a suitable transducer and the pressure-reducing valve 80 is electronically controlled such that the pressure in the secondary side 82 is selectively controlled from the cab of the towing vehicle during operations based on the conditions encountered by the implement 10. In one embodiment, the hydraulic circuit 74 contains a pilot-operated check valve 90 to isolate the pressure-reducing valve 80 and hydraulic circuit 74 from the hydraulic supply 76. Alternately, a valve in the towing vehicle's hydraulic system may be used to isolate the hydraulic down-pressure system 70.

The secondary side 82 of the hydraulic circuit 60 is configured such that hydraulic cylinders 72A-72X are arranged in series such that hydraulic cylinders 72B-72X are slave cylinders to the master cylinder 72A. In one embodiment, a first hydraulic line 92 runs between the pressure-reducing valve 80 and a piston side 94 of the master cylinder 72A. A second line 96 runs between a rod side 98 of the master cylinder 72A and the piston side 100 of the slave cylinder 72B. A final line 102 runs between the rod side 104 of the slave cylinder 72X and the check valve 90. However, one skilled in the art will understand that the hydraulic cylinders 72A-72X may alternately be configured in a parallel arrangement.

Controlling the precharge in the secondary side 82 of the hydraulic circuit 74 enables the operator of the implement 10 to adjust the down pressure provided by the hydraulic cylinders 72A-72X based on desired stiffness of the implement 10 and differing field conditions. With the use of the pressure-reducing valve 80 to produce a constant adjustable desired pressure, an operator is able to command flow from the towing vehicle through the pressure-reducing valve 80 once the implement 10 is at its working depth as set by the depth-control system 32 and put down-pressure on the tillage tools 40. Once this desired down-pressure has been achieved, flow from the hydraulic supply 76 from the towing vehicle can be shut off and the check or blocking valve 90 will then hold the pressure such that the cylinders 72A-72X hold the plurality of tillage tools tillage tools 40 in the desired position.

The foregoing has broadly outlined some of the more pertinent aspects and features of the present disclosure. These should be construed to be merely illustrative of some of the more prominent features and applications of the disclosure. Other beneficial results can be obtained by applying the disclosed information in a different manner or by modifying the disclosed embodiments. Accordingly, other aspects and a more comprehensive understanding may be obtained by referring to the detailed description of the exemplary embodiments in conjunction with the accompanying drawings.

The invention claimed is:

1. A tillage implement, comprising:
a frame having a center section and first and second outer wing sections hingedly attached to outer ends of the center section such that the first and second wing sections are configured to be operably raised and lowered between a field-working position and a transport position;
a gang assembly carrying a plurality of tillage tools, the gang assembly including a left arm, a center arm, and a right arm, each of the left, center, and right arms having a rotating shaft that is supported on a support bar, wherein the support bar of each arm is mounted to a respective left, center, or right rock shaft, each of the left, center, and right rock shaft supported for rotational movement relative to the frame;
frame-supporting wheels mounted to wheel-mounting spars which are rigidly attached to another rock shaft, wherein the another rock shaft is mounted to the frame for rotational movement relative to the frame controlled by a depth-control system, and wherein the depth-control system includes an actuator configured to rotate the another rock shaft and move the frame relative to the frame-supporting wheels upwardly or downwardly to raise or lower a working of the tillage tools;
a hydraulic down-pressure system configured to act upon the gang assembly, the hydraulic down-pressure system comprising a plurality of hydraulic cylinders, the hydraulic cylinders extending between the frame and the left, center, and right rock shafts and configured to rotate the rock shafts, wherein the plurality of hydraulic cylinders connect to the plurality of tillage tools through the left, center, and right rock shafts such that the plurality of hydraulic cylinders provide a downward pressure precharge on the tillage tools; and
a hydraulic circuit associated with the hydraulic down-pressure system, the hydraulic circuit including;
a hydraulic supply in a primary side of the hydraulic circuit, wherein the hydraulic down-pressure system includes a pressure-reducing valve configured to regulate a pressure in a secondary side of the hydraulic circuit;
a check valve configured to isolate the secondary side of the hydraulic circuit from the hydraulic supply; and
a pressure gauge configured to measure the pressure in the secondary side of the circuit and convey the measured pressure to an operator of the tillage implement;
wherein regulating the pressure in the secondary side of the hydraulic circuit enables the operator to adjust the downward pressure precharge provided by the plurality of hydraulic cylinders based on a desired stiffness of the implement, and wherein the pressure-reducing valve is configured such that flow from the hydraulic supply through the pressure-reducing valve applies the downward pressure precharge on the plurality of tillage tools, and once the downward pressure precharge has been achieved, flow from the hydraulic supply is configured to be terminated while the check valve holds the pressure such that the plurality of hydraulic cylinders hold their respective tillage tools in a preselected position; and
wherein the pressure-reducing valve is configured such that flow from the hydraulic supply through the pressure-reducing valve is configured to be terminated once the tillage tools are at the working depth set by the depth-control system, and wherein the check valve keeps the downward pressure precharge on the plurality of tillage tools, such that the first and second cylinders hold their respective plurality of tillage tools in the desired position.

2. The tillage implement of claim 1, wherein the pressure-reducing valve comprises a pilot-operated, sliding spool, screw-in cartridge style, hydraulic pressure-reducing valve.

3. The tillage implement of claim 1, wherein the hydraulic cylinders are arranged in series such that at least one hydraulic cylinder of the plurality is a slave cylinder to a master cylinder, wherein the master cylinder is another hydraulic cylinder of the plurality.

4. The tillage implement of claim 1, wherein the pressure gauge comprises a transducer and wherein the pressure-reducing valve is electronically controlled such that the pressure in the secondary side is selectively controllable from a cab of a vehicle towing the tillage implement during operations based on conditions encountered by the tillage implement.

5. The tillage implement of claim 1, wherein the check valve comprises a pilot-operated check valve.

6. The tillage implement of claim 1, wherein the hydraulic supply is provided by a towing vehicle.

7. A system comprising a vehicle towing the tillage implement of claim 6, wherein a valve in a hydraulic system of the vehicle is operable to isolate the hydraulic down-pressure system.

8. A tillage implement, comprising:
a frame;
a gang assembly carrying a plurality of tillage tools, the gang assembly including a rotating shaft supported on a support bar, wherein the support bar is mounted to a rock shaft, the rock shaft supported for rotational movement relative to the frame;

a plurality of wheels supporting the frame and mounted to wheel-mounting spars rigidly attached to another rock shaft, wherein the another rock shaft is configured to rotate relative to the frame responsive to a depth-control system, wherein the depth-control system comprises an actuator configured to rotate the another rock shaft and move the frame upwardly or downwardly relative to the wheels to raise or lower a working depth of the tillage tools;

a hydraulic down-pressure system configured to act upon the gang assembly, the hydraulic down-pressure system comprising a plurality of hydraulic cylinders configured to rotate the rock shaft, wherein the plurality of hydraulic cylinders connect to the plurality of tillage tools through the rock shaft such that the plurality of hydraulic cylinders provide a downward pressure precharge on the tillage tools; and a hydraulic circuit associated with the hydraulic down-pressure system, the hydraulic circuit comprising a primary side and a secondary side, the hydraulic circuit including:

a hydraulic supply in the primary side;

a pressure-reducing valve configured to regulate a pressure in the secondary side of the hydraulic circuit;

a check valve configured to isolate the secondary side of the hydraulic circuit from the hydraulic supply; and a pressure gauge configured to measure the pressure in the secondary side and convey the measured pressure to an operator of the tillage implement;

wherein the pressure-reducing valve is configured such that flow from the hydraulic supply through the pressure-reducing valve applies the downward pressure precharge on the plurality of tillage tools, and wherein when flow from the hydraulic supply is shut off, the check valve is configured to hold the pressure in the secondary side such that the plurality of hydraulic cylinders hold their respective tillage tools in a preselected position relative to the frame; and wherein the pressure-reducing valve is configured to terminate flow from the hydraulic supply through the pressure-reducing valve once the tillage tools are at the working depth, wherein the check valve maintains the downward pressure precharge on the plurality of tillage tools.

9. The tillage implement of claim 8, wherein the frame comprises a plurality of sections hingedly connected such that at least one of the sections is configured to be operably raised to a transport position and lowered to a field-working position.

10. The tillage implement of claim 9, wherein the rock shaft comprises a plurality of rock shaft sections, and wherein at least one of the plurality of hydraulic cylinders is configured to rotate each rock shaft section.

11. The tillage implement of claim 8, wherein the pressure-reducing valve comprises a pilot-operated sliding spool hydraulic pressure-reducing valve.

12. The tillage implement of claim 8, wherein the pressure-reducing valve comprises an electronically controlled pressure-reducing valve.

13. The tillage implement of claim 8, wherein the hydraulic cylinders are arranged in series such that at least one hydraulic cylinder is a master cylinder and at least another hydraulic cylinder is a slave cylinder to the master cylinder.

14. The tillage implement of claim 8, wherein the pressure gauge comprises a transducer configured to transmit a signal to a vehicle towing the tillage implement.

15. The tillage implement of claim 8, wherein the pressure-reducing valve is configured to be electronically controlled by a vehicle towing the tillage implement.

* * * * *